United States Patent [19]
Nakamura et al.

[11] Patent Number: 5,962,999
[45] Date of Patent: Oct. 5, 1999

[54] METHOD OF CONTROLLING A TORQUE RIPPLE OF A MOTOR HAVING INTERIOR PERMANENT MAGNETS AND A CONTROLLER USING THE SAME METHOD

[75] Inventors: Tomokazu Nakamura, Katano; Noriyoshi Nishiyama, Izumiotsu; Yasufumi Ikkai, Kobe, all of Japan

[73] Assignee: Matsushita Electric Industrial, Japan

[21] Appl. No.: 09/126,020

[22] Filed: Jul. 29, 1998

[30] Foreign Application Priority Data

Jul. 30, 1997 [JP] Japan .................................... 9-204114

[51] Int. Cl.[6] ...................................................... H02P 6/00
[52] U.S. Cl. ......................... 318/432; 318/430; 318/439; 318/592; 318/254
[58] Field of Search ..................................... 318/138, 245, 318/254, 430–439, 799–809

[56] References Cited

U.S. PATENT DOCUMENTS

| | | | |
|---|---|---|---|
| 4,651,068 | 3/1987 | Meshkat-Razavi | 318/254 |
| 4,680,526 | 7/1987 | Okuyama et al. | 318/802 |
| 4,767,976 | 8/1988 | Mutoh et al. | 318/808 |
| 5,841,263 | 11/1998 | Kaneko et al. | 318/807 |
| 5,850,132 | 12/1998 | Garces | 318/599 |
| 5,854,877 | 12/1998 | Lewis | 388/812 |
| 5,886,491 | 3/1999 | Yoshida et al. | 318/592 |

FOREIGN PATENT DOCUMENTS

2-206389  8/1990  Japan .

Primary Examiner—Paul Ip
Attorney, Agent, or Firm—Rossi & Associates

[57] ABSTRACT

Torque ripples of a motor having interior permanent magnets can be reduced through the following method and the torque ripple controller using the same method: first, drive the motor having a plurality of phase windings and interior permanent magnets with a basic current supply circuit which outputs a basic current having a predetermined waveform, then store torque ripple waves produced in the running motor or obtained through a numerical analysis into a torque-ripple-wave-memory, next, compensate the torque ripple wave tapped off from the memory according to a prepared torque ripple compensation pattern and transform it to a torque compensation waveform with a torque-compensation-waveform-producing-circuit, further, multiply the torque compensation waveform tapped off from the waveform producing circuit by the basic current with a multiplier to output a torque ripple control current, and, supply the torque ripple control current to the plurality of phase windings shifting a phase by a predetermined electrical angle sequentially.

14 Claims, 11 Drawing Sheets

METHOD OF CONTROLLING A TORQUE RIPPLE OF A MOTOR HAVING INTERIOR PERMANENT MAGNETS AND A CONTROLLER USING THE SAME METHOD

FIELD OF THE INVENTION

The present invention relates to a driving motor utilized in an electric vehicle and the like, more specifically, a controlling method of a torque ripple of the motor incorporating an interior permanent magnet and a controller using the same method.

BACKGROUND OF THE INVENTION

Regarding a motor having permanent magnets pasted on a rotor surface (hereinafter called "surface permanent magnet type motor"), a conventional method of reducing torque ripples is described as follows:

When the motor is not yet powered on, either a shape of a permanent magnet which is to be pasted on a surface of a rotor or a shape of a stator core is modified so that a waveform of an induced voltage which occurs at stator windings can be a sine wave when a rotor is rotated by some means from outside. Then, a driving current of a sine wave is applied to the windings, thereby reducing a torque ripple.

Figure 17:
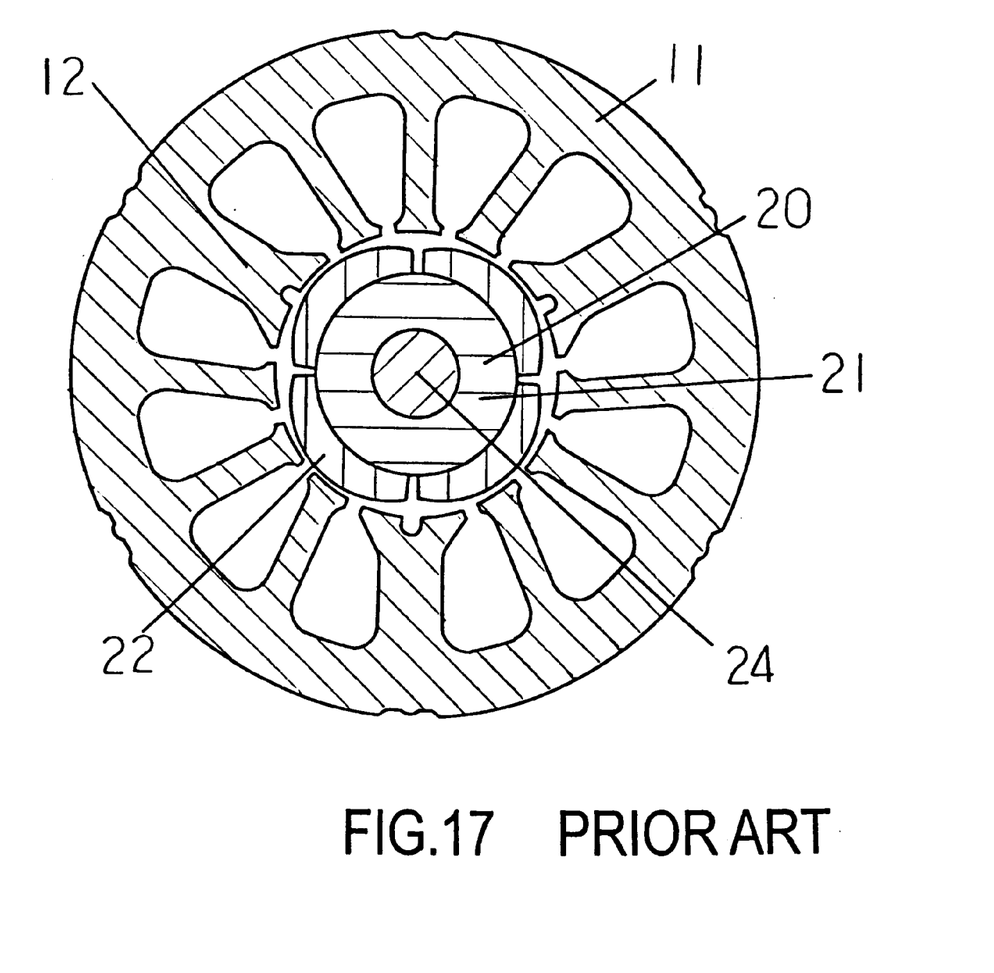
FIG. 17 is a cross sectional view of a conventional surface-permanent-magnet type motor which also reduces the torque ripple.

FIG. 17 is a cross sectional view of the surface permanent magnet type motor which adopts the above method to reduce torque ripples. In FIG. 17, a shaft 24 pierces through and is fixed to the center of rotor core 21 comprising a laminated steel plate. A permanent magnet 22 is pasted with glue or the like on the surface of the rotor core 21. A shape of the permanent magnet is as follows: both of its inner and outer diameters are convex arc toward outside, and the radial center width is wider than those of both ends. The surface permanent magnet type rotor 20 comprises the above elements, i.e., the rotor core 21, magnet 22 and shaft 24.

A stator 11 has a plurality of teeth 12, and the teeth are provided with windings (not shown.) The rotor 20 faces to the stator 11 with an air gap having a narrow clearance in between.

When magnetic flux produced from the magnet 22 runs to the teeth 12 of the stator 11, quantity of magnetic flux varies moderately due to the above rotor's structure, whereby an induced-voltage-waveform produced in the windings can be approximated to a sine wave. Then, a current of sine wave is applied to the above winding, thus the torque ripple can be reduced.

However, when this type of motor is rotated at a high speed, the magnets 22 pasted to the rotor surface scatter due to centrifugal force, thus some measure is required such as covering the rotor 20 with a tube made of stainless steel.

Regarding a reluctance motor having no permanent magnet, a current pattern which can narrow spread of the produced torque is established in the current supplied to the windings, and then the torque is controlled based on the pattern of the supplied current. This method is laid open in the Japanese Patent Application non-examined publication No. H02-206389.

These kinds of motors are indeed strongly built; however, they sometimes produce insufficient torque due to no magnet.

In order to overcome these problems, a motor with interior permanent magnets has been recently commercialized. This motor incorporates the permanent magnets inside the rotor core, thereby realizing high efficiency and a high torque.

Figure 5:
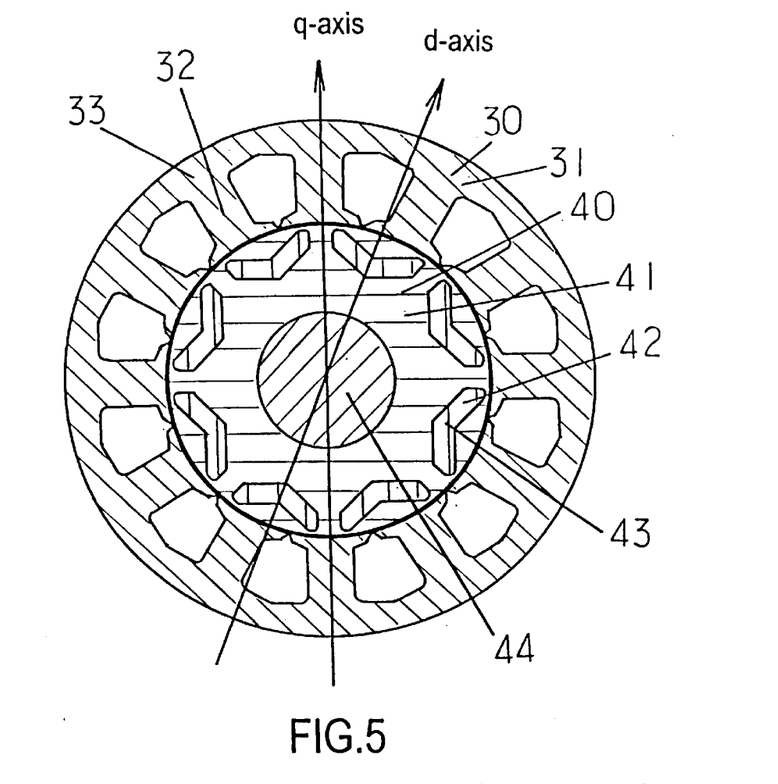
FIG. 5 is a cross sectional view of the motor having the interior permanent magnets.
Figure 6:
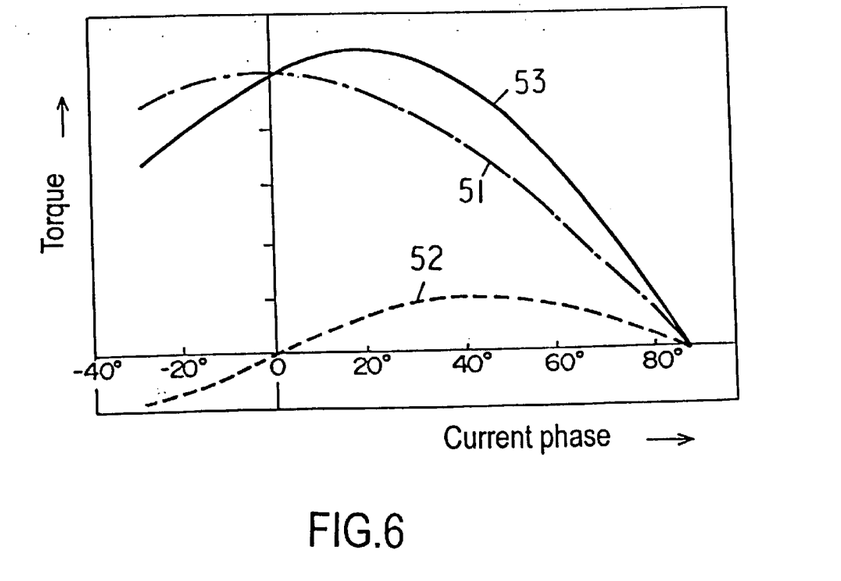
FIG. 6 depicts a torque produced in the motor having the interior permanent magnets.

FIG. 5 is a cross sectional view depicting a structure of the motor having interior permanent magnets, and FIG. 6 illustrates the torque produced by this kind of motor, where the X-axis indicates a current phase supplied to the stator windings and the Y-axis indicates a magnitude of the torque. In FIG. 6, a curve 51 represents a torque produced by the magnet (hereinafter called "magnet torque"), a curve 52 represents a reluctance torque and a curve 53 represents a combined torque of these two.

In the structure shown in FIG. 5, the following relationship is established:

$$Ld < Lq$$

where Ld is an inductance along "d" direction, and Lq is an inductance piercing the boundary of the rotor poles.

In general, the torque T of the motor is indicated by the following equation:

$$T = Pn\{\psi a \cdot I \cdot \cos\beta + 0.5(Lq-Ld)I^2 \cdot \sin 2\beta\}$$

where "Pn" is a number of pairs of the rotor poles, "ψa" is an interlinkage magnetic flux between the rotor and stator, "I" is a winding current of the stator, and "β" is a lead phase angle (electrical angle).

Figure 18:
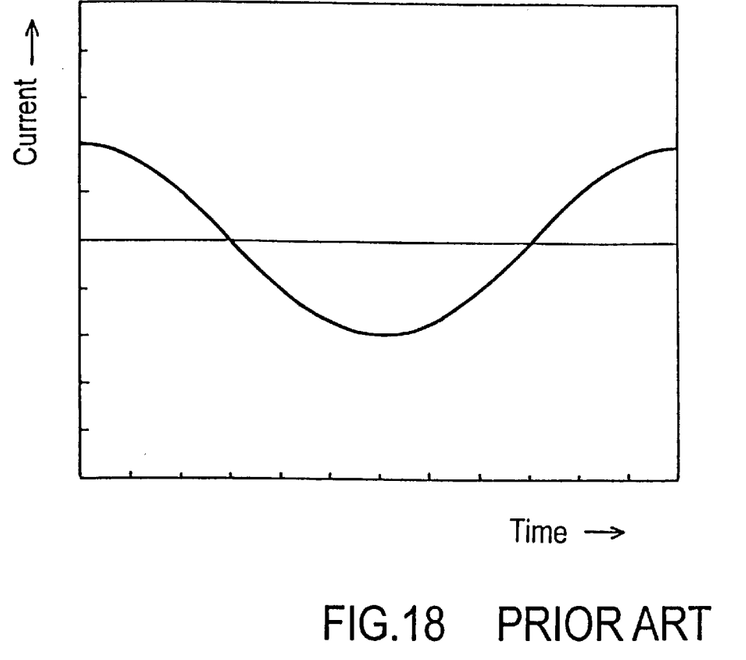
FIG. 18 is a sine waveform of the current.
Figure 19:
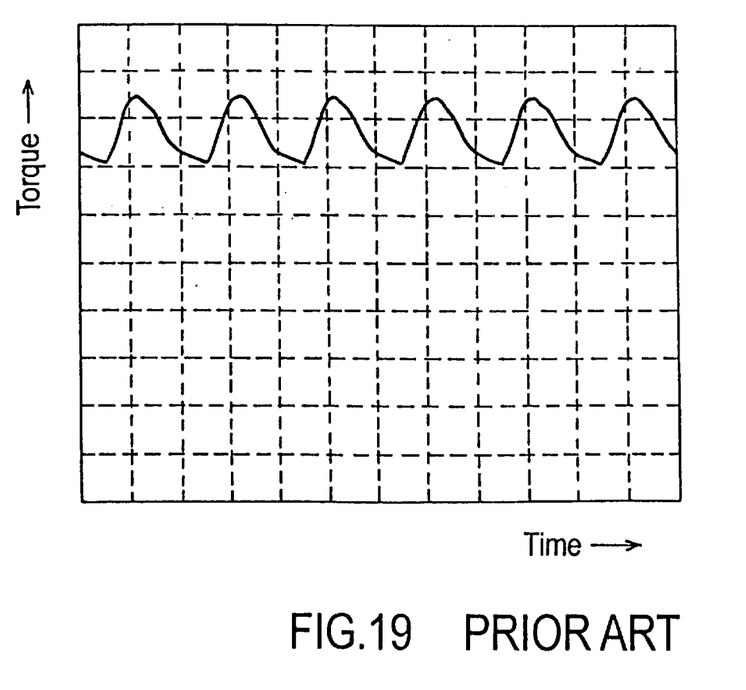
FIG. 19 is a torque ripple waveform produced in the motor having interior permanent magnets driven by the sin waveform current shown in FIG. 18.

In the above equation, the first term represents a magnet torque and the second term represents a reluctance torque. Since Ld<Lq is established in the above equation, the phase of winding current "I" is controlled to advance with regard to the phase of the induced voltage produced in each phase, whereby β>0 is realized and a reluctance torque is produced. Thus, comparing with the case with a magnet torque only, the above structure can produce a larger torque at the same current level by setting "β" at a predetermined value. When the motor having the above interior permanent magnets is driven by the sine wave current shown in FIG. 18, a torque ripple shown in FIG. 19 is produced. This torque ripple is combined by the magnet torque and reluctance torque.

As such, the motor having the interior permanent magnets has a difficulty in reducing the torque ripple because the produced torque is combined by the magnet torque and reluctance torque although the stator-winding-current is shaped into a sine wave.

The above description can be summarized as follows: The conventional surface-permanent-magnet type motor produces torque due to only the permanent magnets, therefore, the shape of the magnet is modified so that the waveform of induced voltage produced in the stator windings is approximated to a sine wave and the current of sine wave is supplied to the windings, thereby reducing the torque ripple. On the other hand, in the motor having the interior permanent magnets, the waveform of the induced voltage produced in the stator windings would be approximated to a sine wave, and the current of the sine wave would be supplied to the windings, the produced torque is combined by the magnet torque and reluctance torque. Therefore, even the torque ripple component due to the permanent magnet can be reduced, the other component due to the reluctance torque cannot be reduced.

SUMMARY OF THE INVENTION

The present invention addresses the above problems and aims to provide a method of controlling torque ripples and a controller using this method for realizing an interior-permanent-magnet type motor having low torque ripples.

The controlling method of torque ripples produced in the motor having interior permanent magnets and a plurality of phase windings according to the present invention has the following steps:

(a) driving the motor with a basic current supply circuit which outputs a current having a predetermined waveform, (b) storing a torque ripple wave produced in the running motor driven with the basic current, or a torque ripple wave obtained through numerical analysis such as the finite element method in torque ripple wave memory, (c) compensating a torque ripple wave tapped off from the memory means according to a torque ripple compensation pattern prepared by a torque compensation waveform producing circuit, and transforming thereof into a torque compensation waveform, (d) multiplying the torque compensation waveform tapped off from the waveform producing circuit by the basic current in multiplication circuit, (e) supplying a torque ripple control current tapped off from the multiplication circuit to the plurality of phase windings with torque ripple control current supply circuit through shifting the phase by a predetermined electrical angle sequentially.

The motor is driven by the torque ripple control current through the methods described above, whereby the torque ripple can be reduced.

There is another method to control the torque ripple according to the present invention, the method comprises the steps of:

(a) driving the motor with a basic current supply circuit which outputs a current having a predetermined waveform, (b) detecting torque ripple waves produced in the motor with torque ripple wave detector, (c) measuring an output signal tapped off from the torque ripple wave detector with torque ripple wave measurement circuit, (d) compensating the torque ripple wave tapped off from the torque ripple wave measurement circuit according to a torque ripple compensation pattern prepared by torque compensation waveform producing circuit, and transforming thereof into a torque compensation waveform, (e) multiplying the torque compensation waveform tapped off from the torque compensation waveform producing circuit by said basic current in multiplication circuit, (f) supplying a torque ripple control current tapped off from the multiplication circuit to the plurality of phase windings through shifting the phase by a predetermined electrical angle sequentially.

As such, the motor is driven by the torque ripple control current, then the torque ripple waves produced in the motor are detected by the torque ripple wave detector and measured by the torque ripple wave measurement circuit sequentially, next, the measured torque ripple waveform is renewed into a new torque compensation waveform sequentially by the torque compensation waveform producing circuit, and then, the renewed torque compensation waveform is multiplied by the basic current to produce a new torque ripple control current, whereby the motor is driven the new torque ripple control current sequentially.

This method is to control torque ripples through, (1) measuring the torque ripple waves produced in the motor, (2) transforming the measured torque ripple waves into the torque compensation waveforms according to the torque ripple compensation pattern, (3) multiplying the torque compensation waveform by the basic current to produce the torque ripple control current, and (4) supplying the torque ripple control current to the plurality of phase windings, thereby driving the motor. The torque ripple produced in the above procedure is detected sequentially by the torque ripple detection means, whereby a feedback control is performed for driving the motor. The torque ripple control current is supplied depending on the torque ripple wave produced in the running motor, thereby reducing the torque ripple responsive to a driving situation of the motor.

There is still another method to control the torque ripple, i.e., a speed sensor is additionally provided to the above steps, and based on a speed detected, in the lower speed area, the motor is driven by the torque ripple control current undergone the torque ripple compensation described above, on the other hand, in the higher speed area, the motor is driven by the basic current namely a supply current having a rectangular or a sine waveform. Therefor, a subject having a heavy weight and a great moment of inertia, such as the electric vehicle among others, takes an advantage of this control method of its driving motor, i.e., the torque ripples are low in its lower speed area, and its conventional driving method of the motor can be employed in its higher speed area where the moment of inertia is great.

There is still further another method to control the torque ripple, i.e., the speed sensor is provided in this method also, and based on the speed detected, in the lower speed area, the motor is driven by the torque ripple control current undergone the torque ripple compensation described above, on the other hand, in the higher speed area, the motor is driven by a torque ripple control current undergone the torque ripple compensation employing a smaller compensation value than that used in the lower speed area. This method can realize an optimum control responsive to the moment of inertial of a subject.

An electric vehicle according to the present invention is driven by the motor having interior permanent magnets. The motor is controlled by the above method so that torque is compensated sufficiently to be low torque ripples in a lower speed area where a moment of inertia is so small that the torque ripple causes vibrations, while in a higher speed area, torque compensation is softened because the moment of inertia of the electric vehicle is great.

As described above, according to the present invention, the motor having the interior permanent magnets can be driven at a low torque ripple level, and thereby providing a motor control method and a motor controller of high performance.

Further, when the torque ripple control method is adopted to the motor having the interior permanent magnets which is employed in the electric vehicle, the electric vehicle can be operated with less torque ripples and high efficiency.

BRIEF DESCRIPTION OF THE DRAWINGS

FIGS. 8–10 also illustrates the same.

DESCRIPTION OF THE PREFERRED EMBODIMENTS

Exemplary embodiments of the present invention are described by referring to the attached drawings.
Exemplary Embodiment 1

Figure 1:
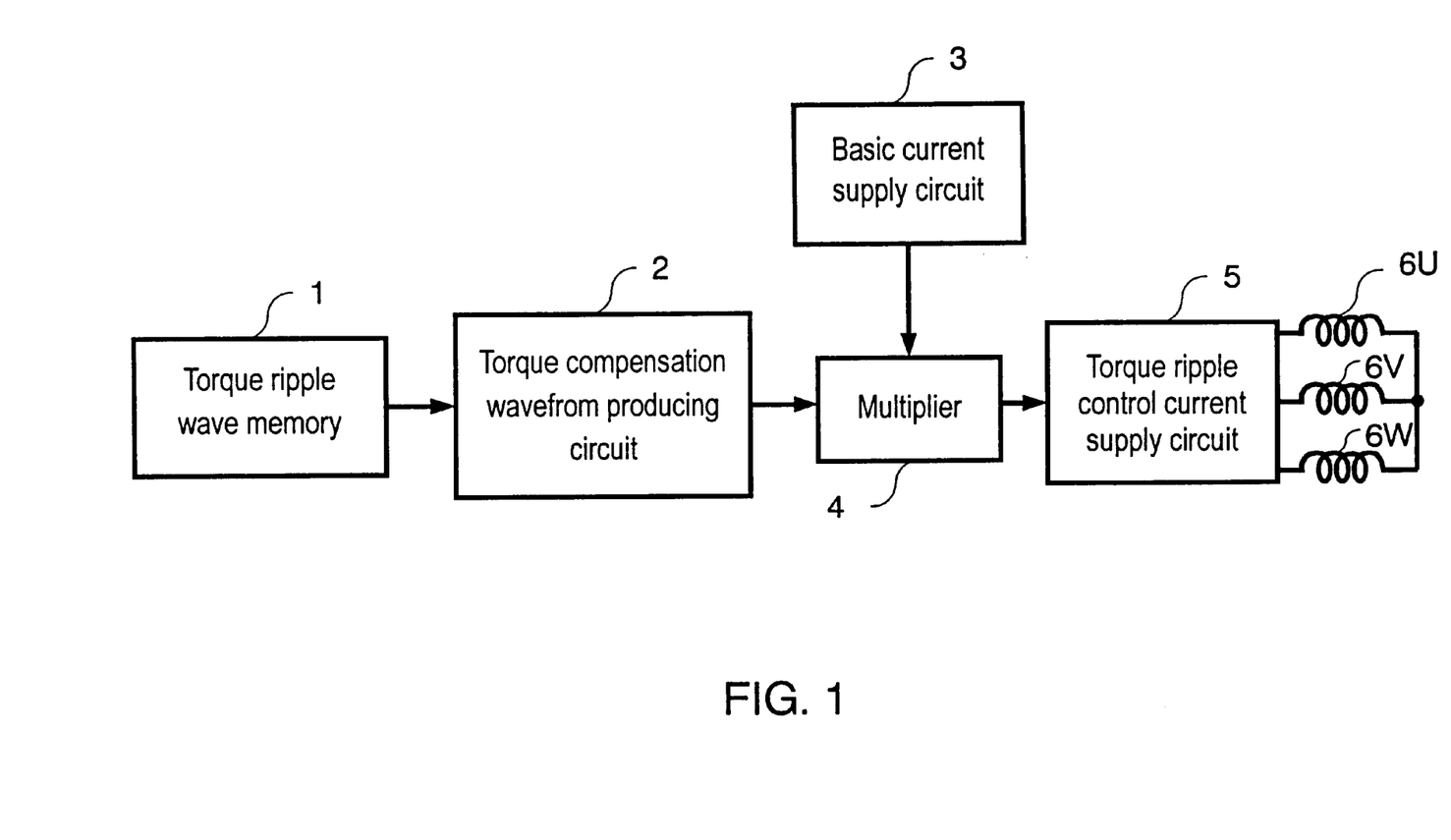
FIG. 1 is a block diagram depicting a controlling procedure of the torque ripple produced in a motor having interior permanent magnets used in the first exemplary embodiment of the present invention.

FIG. 1 is a block diagram depicting a controlling procedure of the torque ripple produced in a motor having interior permanent magnets used in the first exemplary embodiment of the present invention.

FIG. 5 is a cross sectional view of the motor having interior permanent magnets. In FIG. 5, a stator 30 comprises the following elements: a stator core 31 made of laminated steel plates and consisting of one of twelve blades of teeth 32 and a corresponding yoke 33 which locates at root of the teeth 32, and windings provided to each stator core 31, where these individual stator cores are connected with each other by LASER welding or the like to form a cylinder.

The twelve blades of teeth 32 are provided with concentrated windings respectively (not shown.) One winding is coupled to the third, sixth and ninth windings counted therefrom in series to form one "U" phase winding. Another winding next to the above winding is also coupled to the third, sixth and ninth windings counted therefrom in series to form one "V" phase winding. In the same manner, the remaining winding is also coupled in series to form one "W" phase winding. These "U", "V" and "W" phase windings constitute three-phase stator windings.

A rotor 40 is coaxial with the stator 30 and shapes in cylinder. An outer surface of the rotor 40 faces to an inner surface of the stator 30 via an air-gap having a narrow clearance therebetween. The rotor 40 is supported by a bearing (not shown) so that the rotor 40 can rotate on a shaft 44. Further, in the rotor 40, eight slits 42 shaping in "V" letters are punched through axially with an approximate equal interval along a rotational direction of a rotor core 41, and the slits 42 receive permanent magnets 43, whereby eight magnetic poles are formed. The permanent magnets are inserted in the slits so that alternate pole N and pole S are arranged sequentially. The permanent magnet 43 can be a solid type, which is inserted in the slit 42 and fixed with glue, or the permanent magnet can be a resin type, which is molded in the slit 42 before being magnetized.

A terminal plate (not shown) is provided on both the ends of the rotor core 41 and riveted with pins (not shown) using through holes (not shown) axially so that the magnets 43 are fixed in the rotor core 41.

The rotor magnetic pole attracts or repels the teeth 32 of the stator 30 due to rotating magnetic field, whereby the rotor 40 is rotated.

In FIG. 1, the motor having interior permanent magnets has three-phase windings, namely, 6U, 6V and 6W, which are driven by currents with a different phase of respective 120 degree electrical angles. When a motor is driven by a basic current, e.g., rectangular waveform current, a torque ripple is produced in the motor. The data of this torque ripple is stored in torque ripple wave memory 1 comprising a semiconductor memory. The memory 1 outputs torque ripple waves to torque compensation wave producing circuit 2. The wave producing circuit 2 compensates the input torque ripple wave according to a prepared torque ripple compensation pattern, and outputs a torque compensation wave. Multiplication circuit 4 receives the torque compensation wave from the wave producing circuit 2 as well as the above basic current, i.e., rectangular waveform current from basic current supply circuit 3, and multiplies these two waves with each other to produce a torque ripple control current, which is fed into torque ripple control current supply circuit 5. The current supply circuit 5 supplies a current corresponding to the torque ripple control current to the above three-phase windings, i.e., 6U, 6V and 6W.

The data of torque ripple wave to be stored in the torque ripple wave memory 1 can be the data of the torque ripple wave actually produced in the motor as above, or data obtained through a numerical analysis such as a finite element method.

Figure 7:
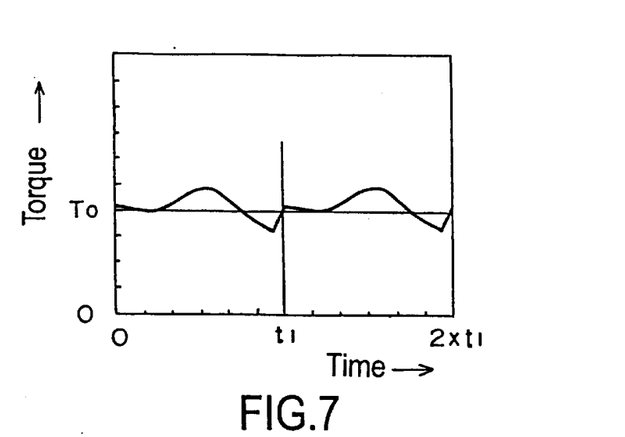
FIG. 7 depicts how to calculate compensated waveform for controlling the torque ripple in the first exemplary embodiment.

FIG. 7 depicts the torque ripple when the motor having the permanent magnets is driven by a rectangular current. In FIG. 7, time span "0–t1" is counted one cycle, and the waveform therein is repeated. This waveform is stored in the torque ripple wave memory 1. The torque compensation wave producing circuit 2 calculates a torque compensation waveform based on the stored data of torque ripple wave. An example of calculating the torque compensation wave in the waveform producing circuit 2 is detailed hereinafter.

Figure 8:
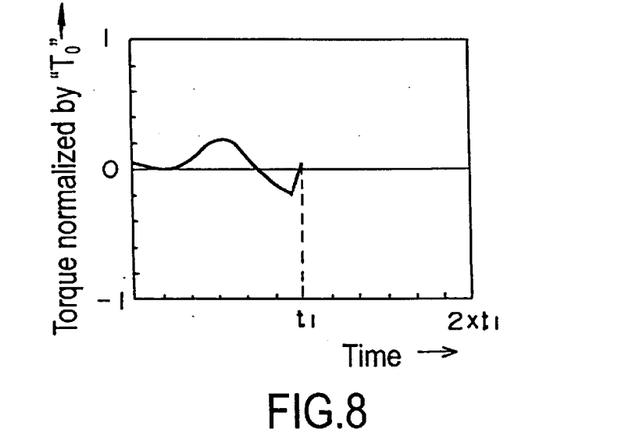
Figure 9:
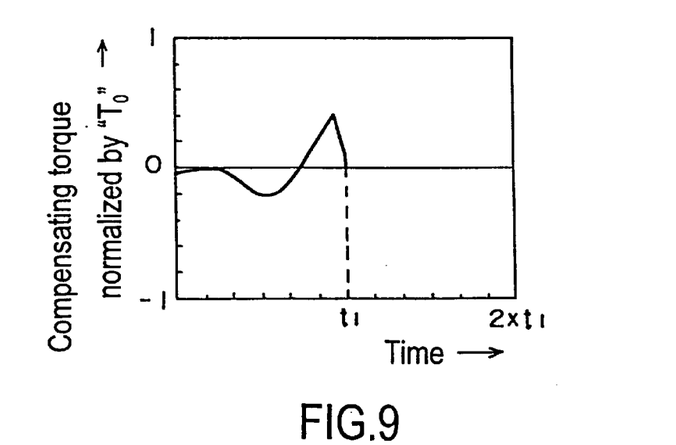

The torque ripple waveform of the time span "0–t1" is normalized by torque "T0", which is illustrated in FIG. 8. Further, FIG. 9 shows a waveform, where a sign (+,−) is inverted when the waveform in FIG. 8 is greater than "0", and the size is doubled and the sign is inverted when the waveform in FIG. 8 is smaller than "0". The waveform in FIG. 9 is used as one cycle of the torque compensation waveform.

Figure 10:
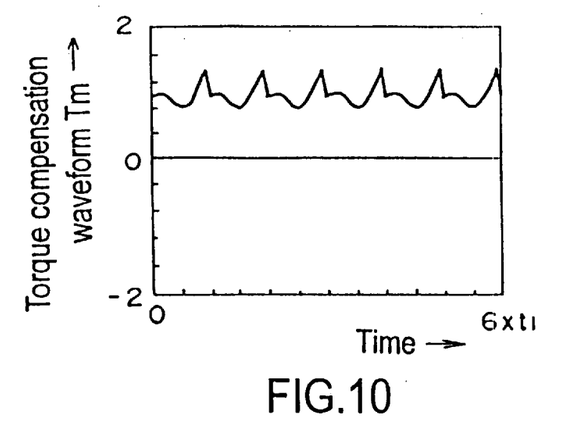
Figure 11:
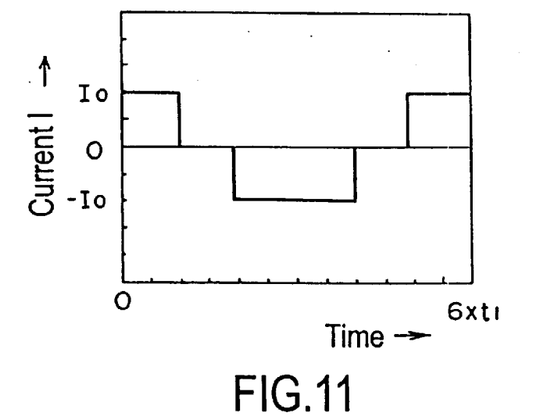
FIG. 11 illustrates a rectangular current supplied from the basic current supply circuit in the first exemplary embodiment.
Figure 12:
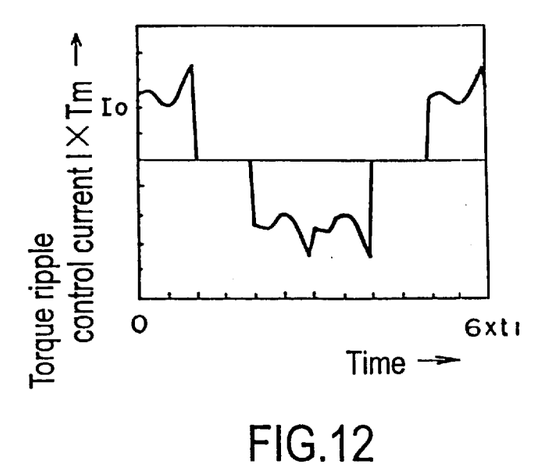
FIG. 12 illustrates a current waveform of controlling the torque ripple in the first exemplary embodiment.

FIG. 10 shows a torque compensation waveform "Tm", where the waveforms per cycle as shown in FIG. 9 constitute an entire waveform, which is then normalized by "1". FIG. 11 shows a rectangular current waveform tapped off from the basic current supply circuit 3, and the multiplier 4 multiplies the rectangular waveform current by the torque compensation waveform "Tm", thereby calculating the torque ripple control current shown in FIG. 12.

The torque ripple control current supply circuit 5 shown in FIG. 1 supplies the torque ripple control current to the three-phase windings 6U, 6V and 6W sequentially through shifting the phase by 120 degree electrical angle respectively, whereby the torque ripple is canceled and reduced.

Figure 13:
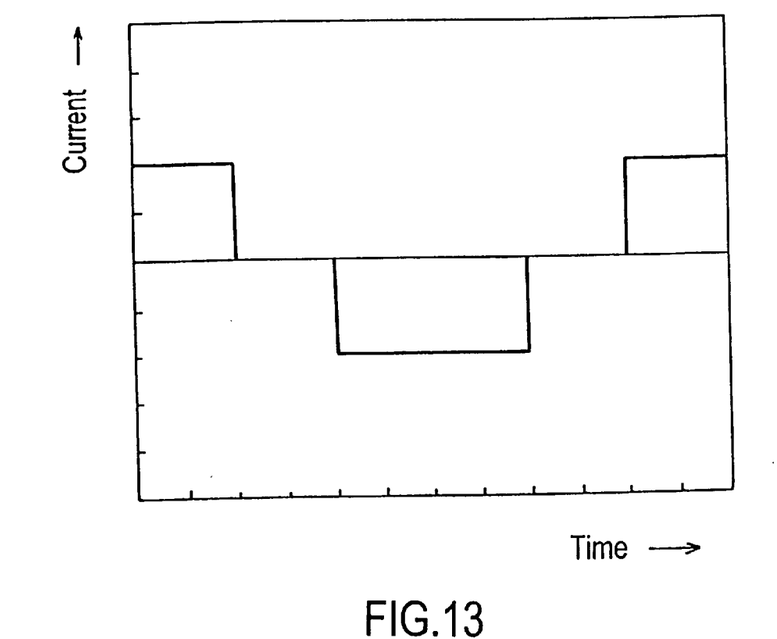
FIG. 13 depicts an example of the current forming a rectangular wave
Figure 14:
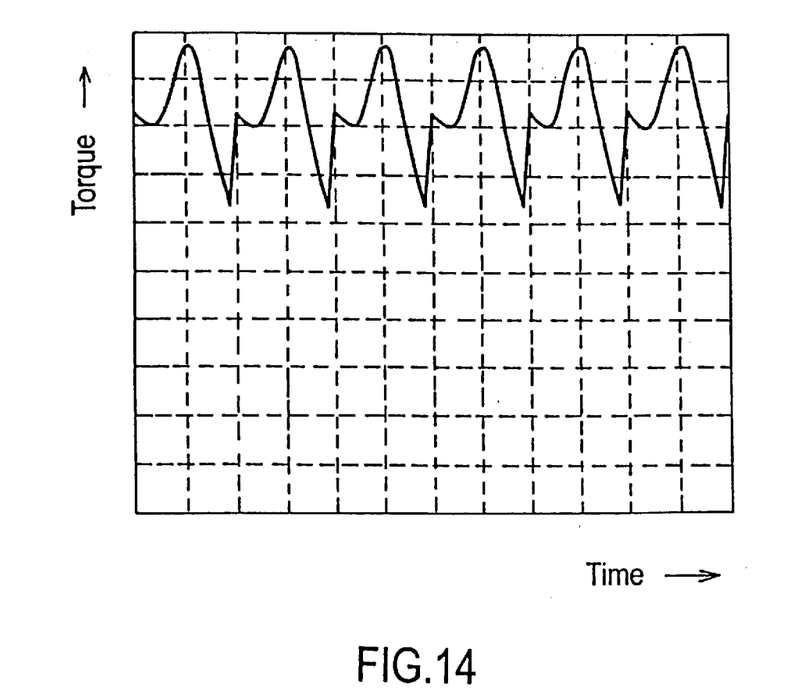
FIG. 14 depicts an example of the torque ripple produced by the motor driven by the rectangular-waveform-current shown in FIG. 13.
Figure 15:
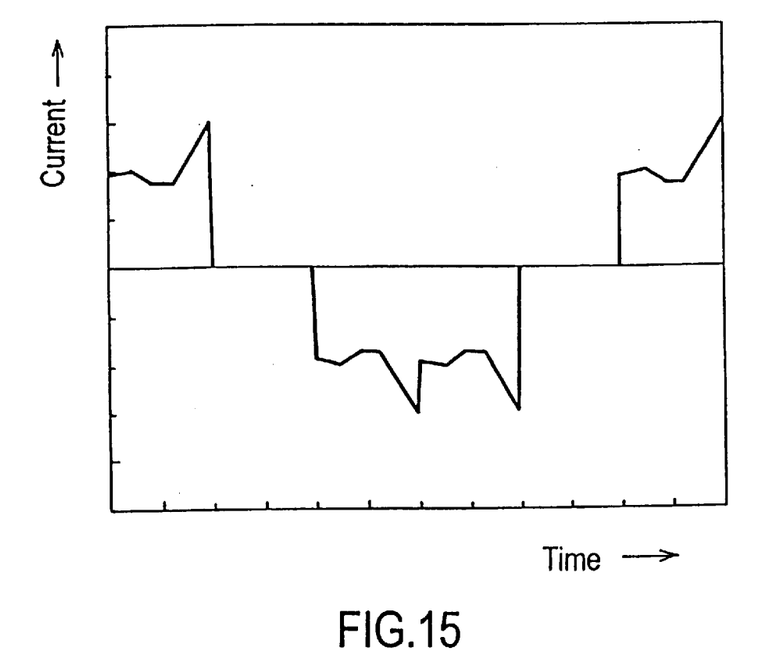
FIG. 15 depicts an example of the control current waveform of the torque ripple for reducing the torque ripple in the first exemplary embodiment.
Figure 16:
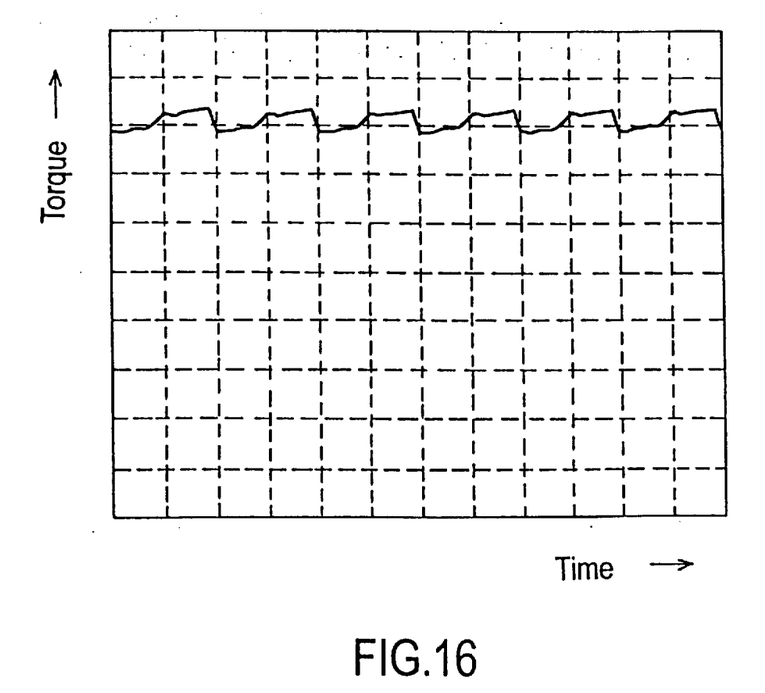
FIG. 16 depicts an example of a torque ripple waveform produced in the motor driven by the control current shown in FIG. 15.

The actual data obtained in the first exemplary embodiment are shown in the drawings. When the motor having the interior permanent magnets shown in FIG. 5 is driven by the rectangular waveform current shown in FIG. 13, the torque ripple waveform shown in FIG. 14 is produced. This torque ripple waveform is modified into the torque ripple control waveform in FIG. 15 through the above calculation, and the motor is driven by the modified torque ripple control waveform shown in FIG. 15, then, the torque ripple waveform as shown in FIG. 16 is produced. This proves that the torque ripple is substantially reduced from the torque ripple as shown in FIG. 19 produced by a conventional motor.

Exemplary Embodiment 2

Figure 2:
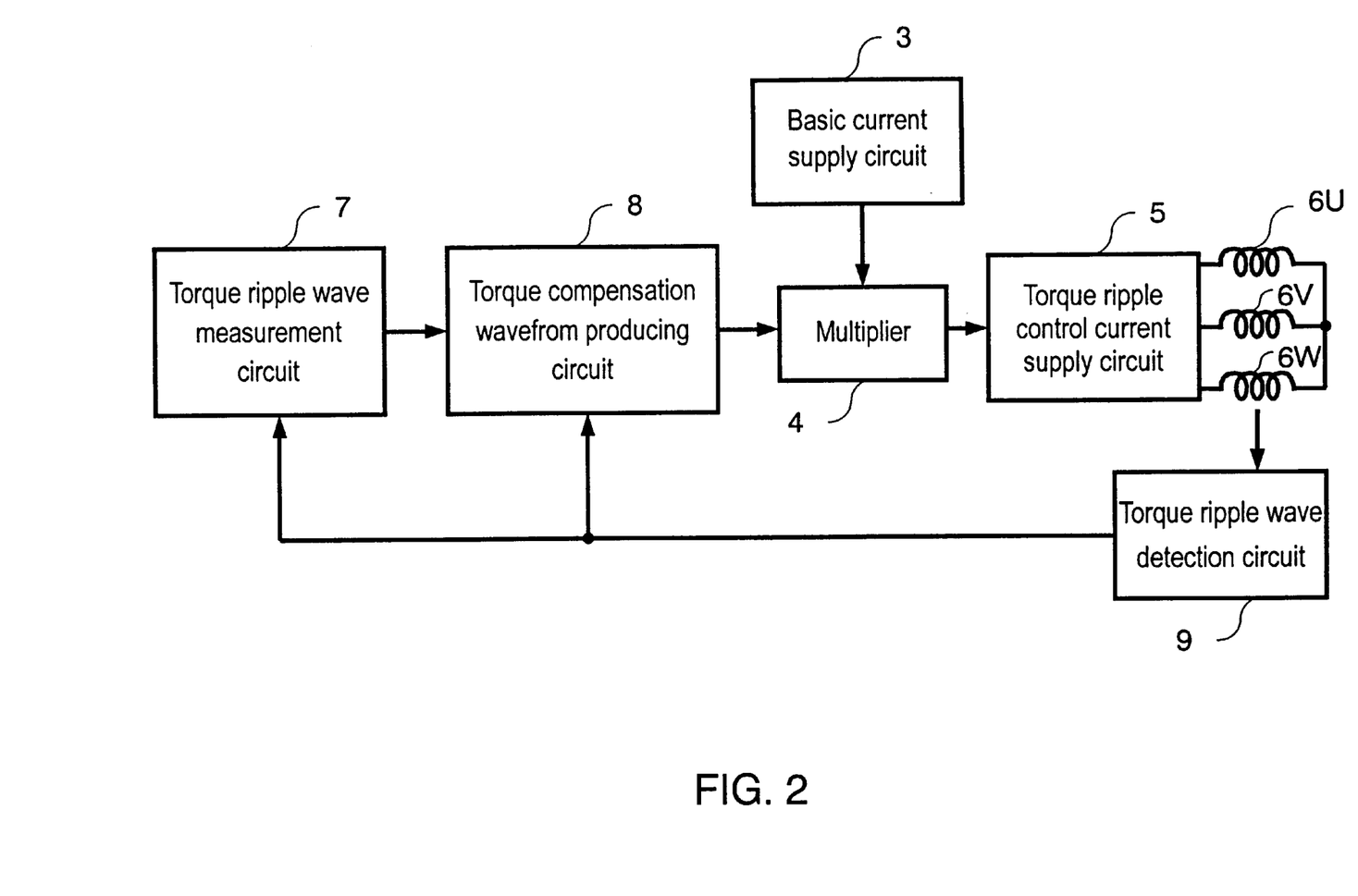
FIG. 2 is a block diagram depicting a controlling procedure of the torque ripple produced in a motor having interior permanent magnets used in the second exemplary embodiment of the present invention.

FIG. 2 is a block diagram depicting a controlling procedure of the torque ripple produced in a motor having interior permanent magnets used in the second exemplary embodiment of the present invention.

In FIG. 2, the motor with the interior permanent magnets has three-phase windings 6U, 6V and 6W, to which currents are supplied with a phase shift of 120 degree electrical angle respectively, thereby the motor is rotated. When this motor is driven by the basic current, e.g., a rectangular waveform current, the torque ripple produced in the motor is detected by torque ripple wave detector 9, and a detected torque ripple wave is measured by torque ripple wave measurement circuit 7.

The torque compensation wave producing circuit 8 transforms the measured torque ripple waves into torque compensation waves according to the torque ripple compensation pattern. The compensation pattern generates torque compensation waves where a difference between the measured torque value and the torque reference value is deducted from the reference value when a torque value of the measured torque ripple waveform exceeds the torque reference value, or generates a torque compensation wave in which the absolute difference therebetween is doubled and added to the reference value when the torque value of the measured torque ripple waveform is lower than the torque reference value.

The multiplier 4 multiplies the torque compensation waveform by the rectangular waveform current supplied from the basic current supply circuit 3 to produce the torque ripple control current. The torque ripple control current supply circuit 5 supplies respective currents corresponding to the torque control currents and 6W. Further, a torque ripple wave produced at this time is measured by the torque ripple wave measuring means 7, and the resulted measurement is fed into the torque compensation waveform producing circuit 8, then the above compensation steps are repeated for feedback control, whereby the motor is driven.

As such, the motor is driven under feedback control, whereby the torque ripples are further suppressed to the lower level than the case of the first exemplary embodiment, where the torque ripple control current is supplied based on the stored data of the torque ripple wave.

When a concentration winding, among others, is provided to the stator, the pattern of the torque compensation waveform produced in the torque compensation waveform producing circuit 8 preferably takes the following described forms. In FIG. 7, set the torque reference value at $T_0$, and produce the torque compensation waveform where the difference between the measured torque value and the torque reference value is deducted from $T_0$ as shown in FIG. 9 when the torque value of the torque ripple waveform exceeds the torque reference value $T_0$. When the torque value is less than the torque reference value $T_0$, the torque compensation waveform formed by the doubled difference is produced as shown in FIG. 9. The torque compensation waveform producing circuit 8 outputs the pattern "Tm" of the torque compensation waveform as shown in FIG. 10 to the multiplier 4.

The basic current supply circuit 3 outputs the rectangular waveform current "I" as shown in FIG. 11 to the multiplier 4, which multiplies the pattern "Tm" by the rectangular waveform current "I" to output the torque ripple control current (I×Tm) to the torque ripple control current supply circuit 5. The current supply circuit 5 supplies currents responsive to the torque ripple control current (I×Tm) to the three-phase windings comprising U, V and W phases.

The method of controlling torque ripples as described above can substantially reduce the torque ripples produced in the motor having the interior permanent magnets therein and concentrated windings on the stator.

Exemplary Embodiment 3

Figure 3:
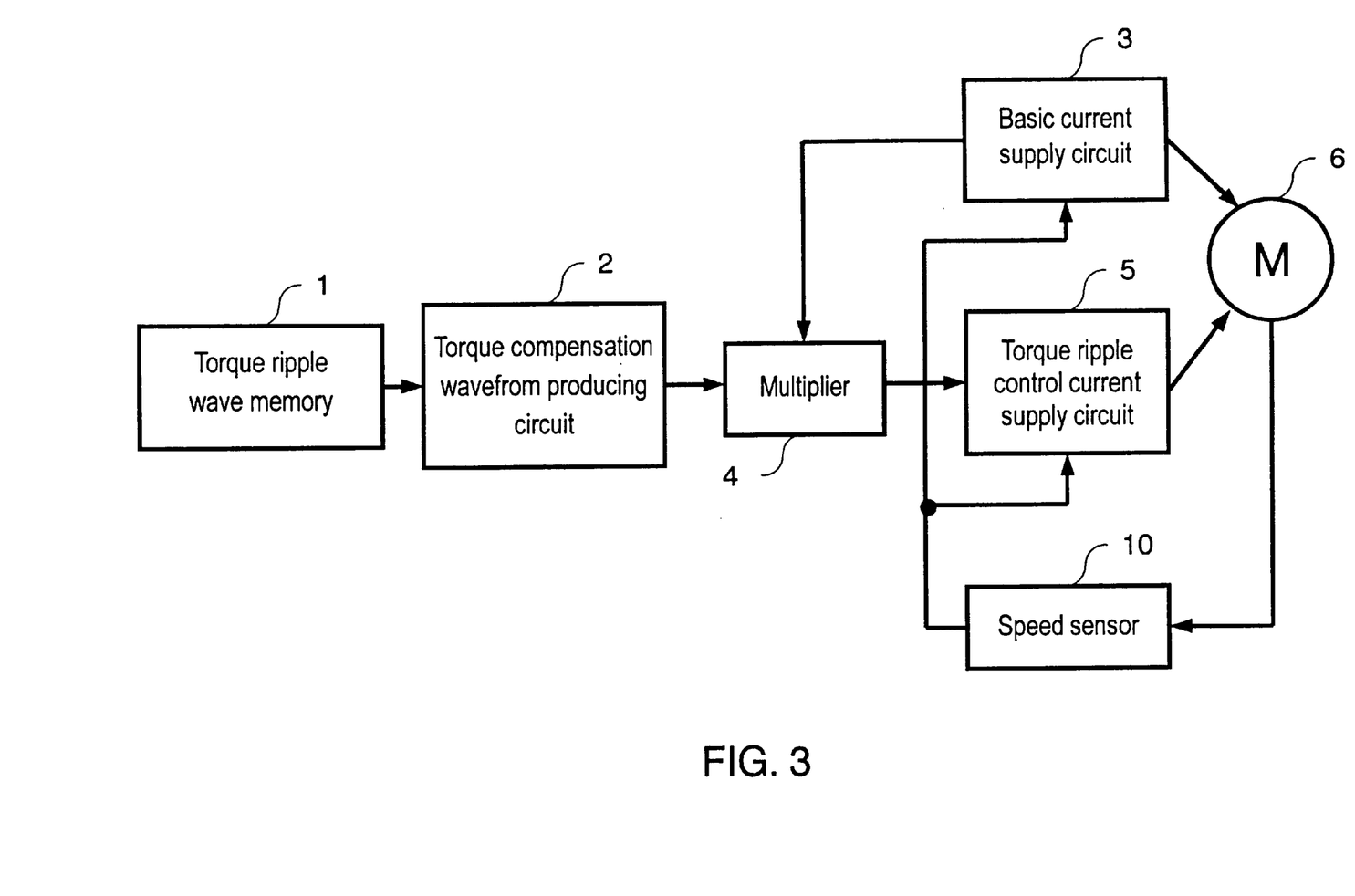
FIG. 3 is a block diagram depicting a controlling procedure of the torque ripple produced in a motor having interior permanent magnets used in the third exemplary embodiment of the present invention.

FIG. 3 is a block diagram depicting a controlling procedure of the torque ripple produced in a motor having interior permanent magnets used in the third exemplary embodiment of the present invention.

In FIG. 3, the following different points from FIG. 1 are found: a speed sensor 10 detecting a rotational speed of a motor 6 is provided, and based on the detected speed, compensation is performed at a lower speed area, thereby driving the motor by a supplied current from the torque ripple control current supply circuit 5, and the compensation is not performed at a higher speed area, thereby driving the motor by the basic current from the basic current supply circuit 3.

The above basic current can be a rectangular wave current or a sine wave current.

As explained above, the speed sensor 10 is provided to the third exemplary embodiment, and based on the detected speed, the current supply to the motor 6 is switched to the torque ripple control current supply circuit 5 or the basic current supply circuit 3.

In the lower speed area, a pattern of the torque ripple substantially depends on the shapes of rotor and stator of the motor 6, therefore, the patterns of compensation current waveforms for reducing the torque ripple are tabled in the torque compensation waveform producing circuit 2, and the waveform can be compensated by using this table upon request. The multiplier 4 multiples the compensated waveform by the basic current, and supplies the multiplication result to the motor 6 via the torque ripple control current supply circuit 5. On the other hand, in the higher speed area, the basic current from the basic current supply circuit 3 is supplied directly to the motor 6.

As such, in the lower speed area, the motor is driven by the torque ripple control current to which the torque ripple compensation is provided, and in the higher speed area, the motor can be driven by the basic current, e.g., a rectangular waveform current or a sine waveform current without the torque ripple compensation. Therefore, the torque ripple is at a low level in the lower speed area where a moment of inertia is small, and the conventional motor control using the basic current is available in the higher speed area where moment of inertia is great.

Since the compensation is not necessary in the higher speed area, the motor can be driven in an efficiency-oriented manner, and further, the conventional motor control can be utilized, therefore, the motor structure can be simplified and the cost can be reduced.

The basic current in this embodiment can be a form of a current with a combined waveform of rectangular and sine waves.

A modification of the third exemplary embodiment is available as follows: in the higher speed area, based on the detected speed by the speed sensor 10, the motor can be driven by the torque ripple control current compensated by the smaller compensation value of the torque ripple than that of in the lower speed area, whereby an optimum control responding to a subject motor and load moment of inertia driven by the subject motor can be realized.

The above optimum control is particularly effective to a subject which is heavy in weight and has a large moment of inertia, such as a motor employed as a driving source of an electric vehicle.

When the above embodiment is employed to control a driving motor of an electric vehicle, the following two advantages should be noted: in the lower speed area (not more than 500 rpm) where a moment of inertia is small, the torque ripple is suppressed at a low level by sufficient torque ripple compensation because the torque ripple causes vibration. 2. In the higher speed area (more than 500 rpm) where the vehicle's moment of inertia is large, the torque ripple is less compensated so that efficiency-oriented driving can be realized.

A status of the torque ripple compensation can be selected before being actualized depending on a size of a moment of inertia and a requested performance.

Exemplary Embodiment 4

Figure 4:
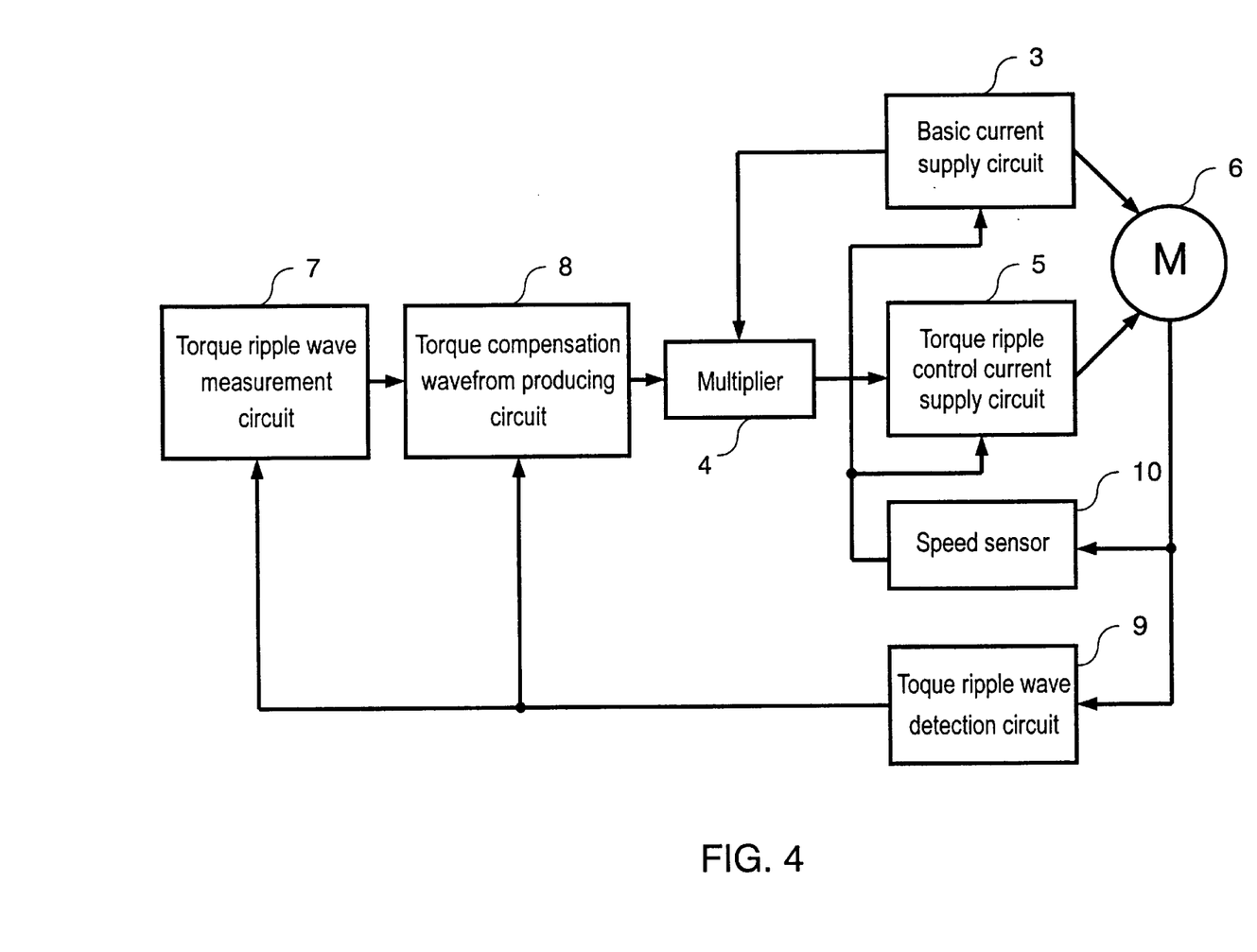
FIG. 4 is a block diagram depicting a controlling procedure of the torque ripple produced in a motor having interior permanent magnets used in the fourth exemplary embodiment of the present invention.

FIG. 4 is a block diagram depicting a controlling procedure of the torque ripple produced in a motor having interior permanent magnets used in the fourth exemplary embodiment of the present invention.

In FIG. 4, the following different points from the second exemplary embodiment shown in FIG. 2 are found: a speed sensor 10 detecting a rotational speed of a motor 6 is provided, and based on the detected speed, compensation is performed at a lower speed area, thereby driving the motor by a supplied current from the torque ripple control current supply circuit 5, and the compensation is not performed at a higher speed area, thereby driving the motor by the basic current from the basic current supply circuit 3.

As explained above, the speed sensor 10 is provided, and based on the detected speed, the current supply to the motor is switched to the torque ripple control current supply circuit 5 or the basic current supply circuit 3.

In the lower speed area, as same as the second exemplary embodiment, the motor is driven by the compensated torque-ripple-control-current using a feedback control, whereby the torque ripple can be suppressed more effectively than in the first and third exemplary embodiments where the torque ripple control current is supplied based on the stored data of torque ripple wave in order to drive the motor.

In the higher speed area, the motor is driven by the current of the rectangular wave or the sine wave supplied from the basic current supply circuit.

As such, in the lower speed area where a moment of inertia is small, the motor is driven by the torque ripple control current to which the torque ripple compensation is provided. In the higher speed area where the moment of inertia is large, the motor can be driven by the basic current as it is, and further, an efficiency-oriented drive can be realized.

The elements comprising the circuits shown in FIGS. 1, 2, 3 and 4 also can comprise not only analog circuits but also digital circuits, or software using a micro-computer.

In the above embodiments, the motor with the interior permanents magnets is described to have concentrated windings, and in general, the concentrated winding produces greater torque ripples than a distribution winding does. Therefore, the control method of torque ripple according to the present invention is extraordinary effective to the motor employing the concentrated windings. The distributed winding is, in the case of three-phase windings, e.g., the U phase winding strides over three adjoining teeth, V phase winding also strides over another three adjacent teeth shifted from the above U phase winding by one tooth, and W phase winding strides over yet another three adjacent teeth shifted from the above V phase winding by one tooth. This kind of distributed windings, in general, produce less torque ripples than the concentrated windings do; however, if the control method of the present invention is employed in the motor with the distributed windings, the torque ripple can be further suppressed.

The torque ripple control method for the motor with the interior permanent magnets and the controller using the same method according to the present invention are not only applicable to the driving motor of the electric vehicle, but also to a hermetic motor mounted in a compressor of an air-conditioner, because load torque of the hermetic motor varies great amount, and thus the control method and the controller contribute to reduce the large torque ripple, and yet, this contribution marks a great industrial value.

The present invention is not limited to the above exemplary embodiments, rather, various modifications may be made in the details within the scope and range of equivalents of the claims and without departing from the sprit of the invention.

What is claimed is:

1. A method of controlling a torque ripple of a motor having an interior permanent magnet and a plurality of phase windings comprising the steps of:

(a) driving said motor with a basic current supply means which outputs a current having a predetermined waveform, (b) storing one of an actual torque ripple wave produced in the running motor driven by said basic current and a torque ripple wave obtained through numerical analysis in torque ripple wave memory means, (c) compensating a torque ripple wave tapped off from said memory means according to a torque ripple compensation pattern prepared by torque compensation waveform producing means and generating a torque compensation waveform, (d) multiplying the torque compensation waveform tapped off from the waveform producing means by the basic current in multiplication means, (e) supplying a torque ripple control current tapped off from the multiplication means sequentially to the plurality of phase windings through shifting the torque ripple control current by a predetermined electrical angle.

2. A method of controlling a torque ripple of a motor having an interior permanent magnet and a plurality of phase windings comprising the steps of:

(a) driving said motor with a basic current supply means which outputs a current having a predetermined waveform, (b) detecting a torque ripple wave produced in said motor with torque ripple wave detection means, (c) measuring an output signal tapped off from the torque ripple wave detection means with torque ripple wave measurement means, (d) compensating the torque ripple wave tapped off from the torque ripple wave measurement means according to a torque ripple compensation pattern prepared by torque compensation waveform producing means and generating a torque compensation waveform, (e) multiplying the torque compensation waveform tapped off from the torque compensation waveform producing means by said basic current in multiplication means, (f) supplying a torque ripple control current tapped off from the multiplication means to the plurality of phase windings through shifting the torque ripple control current by a predetermined electrical angle sequentially, wherein the torque ripple is controlled through a method comprising the steps of:

(a-1) driving the motor with said torque ripple control current, (b-1) detecting the torque ripple wave produced in the running motor sequentially with said torque ripple wave detection means, (c-1) measuring the torque ripple wave sequentially with said torque ripple wave measurement means, (d-1) renewing the measured torque ripple wave sequentially to a new torque compensation wave with said torque compensation waveform producing means, (e-1) multiplying the renewed torque compensation waveform by said basic current to produce a new torque ripple control current, (f-1) driving the motor with the new torque ripple control current sequentially.

3. The method of controlling a torque ripple of a motor having an interior permanent magnet and a plurality of phase windings as defined claim 1 or 2 wherein based on a detected speed by a speed sensor of the motor, in a lower speed area, the motor is driven by the torque ripple control current that undergoes the torque ripple compensation, while in a higher speed area, the motor is driven by a basic current.

4. The method of controlling a torque ripple of a motor having an interior permanent magnet and a plurality of phase windings as defined in claim 3 wherein the lower speed area covers not more than 500 rpm (rotations per minute), and the higher speed area covers more than 500 rpm.

5. The method of controlling a torque ripple of a motor having an interior permanent magnet and a plurality of phase windings as defined claim 1 or 2 wherein based on a detected speed by a speed sensor of the motor, in a higher speed area, the motor is driven by the torque ripple control current compensated by a smaller torque ripple compensation value than that in a lower speed area.

6. The method of controlling a torque ripple of a motor having an interior permanent magnet and a plurality of phase windings as defined in claim 5 wherein the lower speed area covers not more than 500 rpm (rotations per minute), and the higher speed area covers more than 500 rpm.

7. The method of controlling a torque ripple of a motor having an interior permanent magnet and a plurality of phase windings as defined claim 1 or 2 wherein when a torque value of the torque ripple waveform exceeds a torque reference value, a torque compensation waveform is produced where a difference between the torque value and the torque reference value is deducted from the reference value, and when the torque value is less than the torque reference value, a torque compensation waveform is produced, where an absolute difference between the torque reference value and the torque value is doubled and added to the reference value to form the torque compensation waveform.

8. A torque ripple controller for a motor having an interior permanent magnet and a plurality of phase windings, said torque ripple controller comprising:

(a) basic current supply means for outputting a basic current having a predetermined waveform, (b) torque ripple wave memory means for storing one of an actual torque ripple wave produced in the running motor driven by said basic current and a torque ripple wave obtained through a numerical analysis, (c) torque compensation waveform producing means for compensating said torque ripple wave tapped off from the torque ripple wave memory means according to a prepared torque ripple compensation pattern and generating a torque compensation waveform, (d) multiplication means for multiplying the torque compensation waveform tapped off from the torque compensation waveform producing means by said basic current, (e) torque ripple current supply means for supplying the torque ripple control current tapped off from the multiplication means to the plurality of phase windings through shifting the phase by a predetermined electrical angle sequentially.

9. A torque ripple controller for a motor having an interior permanent magnet and a plurality of phase windings, said torque ripple controller comprising:

(a) a basic current supply means for outputting a basic current having a predetermined waveform, (b) torque ripple wave detection means for detecting a torque ripple wave produced in said motor, (c) torque ripple wave measurement means for measuring an output signal tapped off from the torque ripple wave detection means, (d) torque compensation waveform producing means for compensating the torque ripple wave tapped off from the torque ripple wave measurement means according to a prepared torque ripple compensation pattern and generating a torque compensation waveform, (e) multiplication means for multiplying the torque compensation waveform tapped off from the torque compensation waveform producing means by said basic current, (f) torque ripple control supply means for supplying a torque ripple control current tapped off from the multiplication means to the plurality of phase windings through shifting the phase by a predetermined electrical angle sequentially, wherein the torque ripple controller of said motor drives said motor with the torque ripple control current through:

(a-1) driving the motor with said torque ripple control current, (b-1) detecting the torque ripple wave produced in the running motor sequentially with said torque ripple wave detection means, (c-1) measuring the torque ripple wave sequentially with said torque ripple wave measurement means, (d-1) renewing the measured torque ripple wave sequentially to a new torque compensation wave with said torque compensation waveform producing means, (e-1) multiplying the renewed torque compensation waveform by said basic current to produce a new torque ripple control current, (f-1) driving the motor with the new torque ripple control current sequentially.

10. The torque ripple controller as defined in claim 8 or 9 further comprising: a speed sensor for detecting a speed of the motor; wherein the motor is driven by a torque ripple control current that has undergone the torque ripple compensation in a lower speed area, while in a higher speed area, the motor is driven by the basic current.

11. The torque ripple controller as defined in claim 10 wherein the lower speed area covers not more than 500 rpm (rotations per minute), and the higher speed area covers more than 500 rpm.

12. The torque ripple controller as defined in claim 8 or 9 further comprising: a speed sensor for detecting a speed of the motor; wherein, based on a detected speed by the speed sensor of the motor, in a higher speed area, the motor is driven by the torque ripple control current compensated by a smaller torque ripple compensation value than that in a lower speed area.

13. The torque ripple controller as defined in claim 12 wherein the lower speed area covers not more than 500 rpm (rotations per minute), and the higher speed area covers more than 500 rpm.

14. The torque ripple controller as defined in claim 8 or 9 wherein when a torque value of the torque ripple waveform exceeds a torque reference value, a torque compensation waveform is produced where an absolute difference between the torque value and the torque reference value is deducted from the reference value, and when the torque value is less than the torque reference value, a torque compensation waveform is produced where an absolute difference between the torque reference value and the torque value is doubled and added to the reference value to form the torque compensation waveform.

* * * * *